(12) United States Patent
Stott

(10) Patent No.: US 7,639,668 B2
(45) Date of Patent: Dec. 29, 2009

(54) METHOD FOR SECURING RTS COMMUNICATIONS ACROSS MIDDLEBOXES

(75) Inventor: David Thomas Stott, Basking Ridge, NJ (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 694 days.

(21) Appl. No.: 11/141,516

(22) Filed: May 31, 2005

(65) Prior Publication Data

US 2006/0272009 A1 Nov. 30, 2006

(51) Int. Cl.
*H04L 12/66* (2006.01)
*H04L 12/28* (2006.01)

(52) U.S. Cl. .......... 370/352; 370/392; 370/401

(58) Field of Classification Search .......... 370/389, 370/392, 352, 401; 709/227, 228, 230
See application file for complete search history.

(56) References Cited

U.S. PATENT DOCUMENTS

| | | | |
|---|---|---|---|
| 7,032,242 B1* | 4/2006 | Grabelsky et al. | 726/11 |
| 7,274,684 B2* | 9/2007 | Young et al. | 370/352 |
| 7,346,770 B2* | 3/2008 | Swander et al. | 713/153 |
| 2002/0122416 A1* | 9/2002 | Xu et al. | 370/352 |
| 2003/0009561 A1* | 1/2003 | Sollee | 709/227 |
| 2005/0210292 A1* | 9/2005 | Adams et al. | 713/201 |

OTHER PUBLICATIONS

J. Rosenberg et al, "SIP: Session initiation protocol," *RFC 3261, IETF*, (Jun. 2002), http://ietf.org/rfc/rfc3261.txt.
J. Rosenberg et al, "STUN—simple traversal of user datagram protocol (UDP) through network address translators (NATs)," *RFC 3489, IETF*, (Mar. 2003). http://ietf.org/rfc/rfc3489.txt.
P. Srisuresh et al, "Middlebox communication architecture and framework," *RFC 3303, IETF*, (Aug. 2002). http://ietf.org/rfc/rfc3303.txt.
Cert, "Multiple vulnerabilities in implementation of the session initiation protocol (SIP)," *CERT/CCCA*-Jun. 2003, *CMU Computer Emergency Response Team (CERT r)*, (Feb. 2003). http://www.cert.org/advisories/CA-2003-06.html.
T. Dierks et al, "The TLS protocol version 1.0," *RFC 2246, IETF*, (Jan. 1999). http://ietf.org/rfc/rfc2246.txt.

* cited by examiner

*Primary Examiner*—Andrew Lee
(74) *Attorney, Agent, or Firm*—M.I. Finston

(57) ABSTRACT

A new method is provided for establishing real-time services that can coexist with NAT and firewalls, even when the signaling protocol uses cryptography. A communication channel between the call server and the middlebox passes information between them about the bearer channels associated with each signaling session.

4 Claims, 9 Drawing Sheets

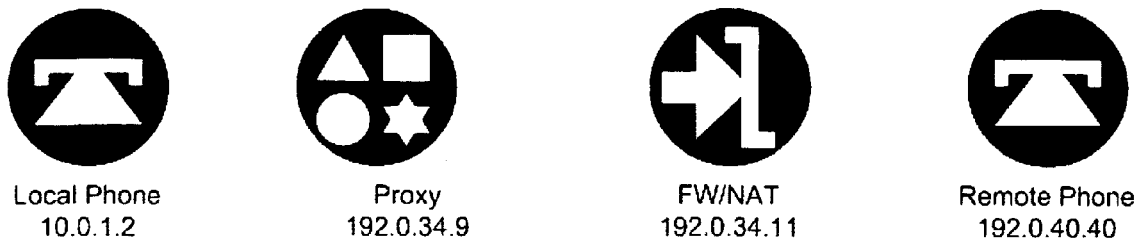
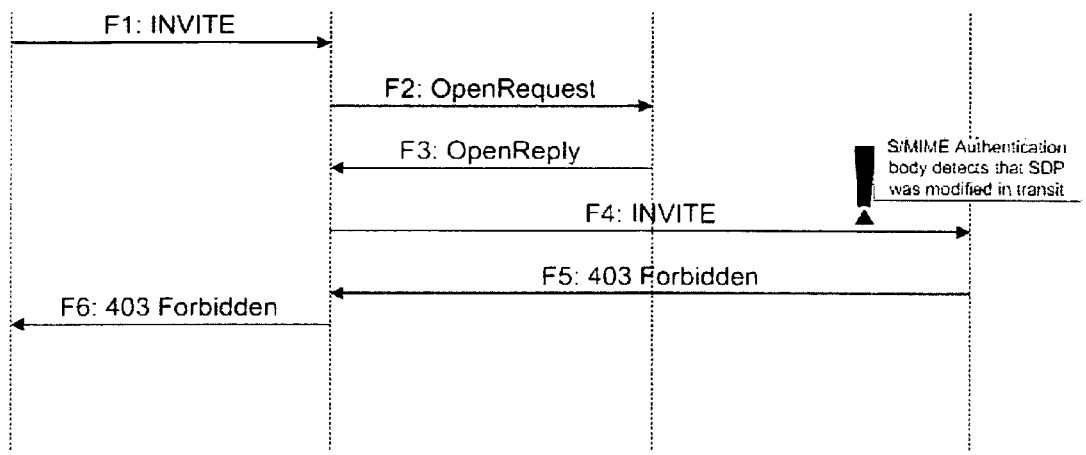
FIG. 7

METHOD FOR SECURING RTS COMMUNICATIONS ACROSS MIDDLEBOXES

FIELD OF THE INVENTION

This invention relates to protocols for communication over the Internet, and more specifically to secure real-time services (RTS) such as Voice Over IP (VoIP) communications.

ART BACKGROUND

Typical Internet applications use a client/server model according to which the client connects to a well-known port number on the server. A "client" in this regard is a program that initiates a network connection, or the host that the program runs on. A "server" in this regard is a program that processes requests from a client connecting to it, or the host that the program runs on. It is typical for at least some port numbers to be publicly posted as belonging to specific applications. For example, it is well known that for conventional Web traffic, the Web server application listens on port 80, and that the SIP server application listens on port 5060.

In VoIP and other RTS applications, however, it is common for the signaling session to be distinct from the bearer session. (The bearer session may also be referred to as the "media" session.) The signaling session conforms to the conventional client/server model. However, in contrast to conventional applications, the parameters for the bearer connection are established in the signaling session. Thus, in particular, the port number for the bearer session may not be known a priori.

For purposes of security and economy, many local communication networks connect to the Internet through an intermediary device such as a firewall (FW) or a Network Address Translation box (NAT). Herein, we refer collectively to such intermediary devices as "middleboxes." A firewall is useful for, among other things, preventing attacks on the local network from outside. A NAT is useful for pooling a limited number of available IP addresses among a larger number of users, and for protecting the identities of individual users inside the local network. Often, the NAT and the firewall occupy the same physical box.

One consequence of separating the VoIP signaling session from the VoIP bearer session is that bearer traffic incoming to the local network from a remote host may be blocked. A "host" in this regard may be any computer that connects to the Internet or to a local intranet.

For example, a firewall will generally permit a local host to open a connection to an outside server and permit the reply to an authorized connection. When a connection request from a local client is let out through the firewall, the firewall will record the ports and addresses used to identify the reply that is coming into the local network from the outside.

In VoIP, however, the local endpoint does not initiate the bearer traffic stream that it is to receive. As a consequence, the firewall does not have the information needed for it to recognize the remote host's traffic, and will therefore block it.

More specifically, for the incoming VoIP bearer stream, the local endpoint will randomly choose a port for the remote endpoint to connect to. The local endpoint will send the identifying number of the randomly chosen port to the remote endpoint in a signaling message. However, because the incoming and outgoing bearer streams are independent, the firewall has no way to determine which of the local ports was chosen to receive the incoming bearer stream. As a consequence, the firewall will not recognize the traffic coming in to that port as legitimate traffic, and will therefore have to block it.

Moreover, in a transmission that conforms to the well-known Real Time Transport Protocol (RTP), the endpoint chooses a random port number. As a consequence, the local administrator will not know, in configuring the firewall, which ports to admit through the firewall for the requested connections.

The VoIP protocols for establishing an RTP session also conflict with some features of NAT-based address translation. The VoIP protocols inherently assume that when the endpoint advertises an IP address and a port, the address will be routable from the remote host and the port will be left unmodified by the network. These assumptions will generally be false if NAT is implemented. In such a case, the endpoint IP address will typically be a protected, private address. Routing directly to such an address from outside the NAT will generally be forbidden. Instead, the NAT will remap the port number and the IP address.

For the above reasons, problems may be encountered when VoIP, as well as other real time services (RTS) such as video and Instant Messaging, attempt to traverse a middlebox such as a NAT or firewall device.

Some methods have been proposed for overcoming the problems described above, and thus for traversing a firewall or NAT. One such method uses an Application Layer Gateway (ALG). The ALG inspects every signaling packet that passes through the NAT box for address or port information. For example, in SIP, this information is included in the Session Description Protocol (SDP) body. Once this information is obtained, new address and port bindings can be obtained for the media stream, and the signaling message can be rewritten with a new, public address and port. However, such methods based on ALGs suffer from certain disadvantages. For example, the ALG needs to be reprogrammed to support each new protocol that is invoked, such methods make intensive use of network resources, and protocols that use cryptography, such as S/MIME encryption or message integrity protocols, are not supported.

Other methods rely on network elements by means of which the endpoints probe the network to determine the specifics of the NAT behavior. Such approaches are disadvantageous because, among other things, they require a relatively large amount of messaging and a relatively large amount of computational resources at the endpoints.

SUMMARY OF THE INVENTION

We have developed a new method for establishing real-time services that can coexist with NAT and firewalls, even when the signaling protocol uses cryptography. The new method adds a communication channel between the call server and the middlebox (e.g., the firewall) to pass information between the two about the bearer channels associated with each signaling session. We refer to both our new method and to the protocols associated with it, as "SAFENeT".

Accordingly, in one broad aspect, our invention involves a method for a call server to support a media session between a local endpoint and a remote endpoint. In a signaling session, the call server receives a message from the local endpoint or the remote endpoint. Among other things, the message requests to establish, modify, or close a connection for the media session and contains local and remote address information for the requested media session. The call server forwards the local and remote address information to the middlebox so that the middlebox will be able to identify packets associated with the media session from at least the forwarded information. The forwarded information will, among other things, enable the middlebox to appropriately process those packets. The call server also forwards the message to a host computer associated with, respectively, the remote endpoint or the local endpoint.

Although specific embodiments of our new method are implemented using the SIP signaling protocol, the principles we have developed are in fact independent of the actual signaling protocol. Thus, for example, our method could equally well be applied to the H.323 protocol instead, or to any other signaling protocol that separates the signaling stream from the bearer stream.

In accordance with our new protocols, the signaling message by which the UA seeks to initiate a new bearer stream (i.e., a media session between the UAs) will contain additional information. The data therein includes the local port number and the local and remote addresses for the media session. The call server reads this data, obtains any necessary port and/or address mappings, and either updates the signaling message accordingly or generates a reply to the original UA with the new mappings. In the absence of end-to-end cryptographic mechanisms (e.g., S/MIME encapsulation), the call server may modify the signaling message with the new fields. When end-to-end cryptography is used, the UA must send a revised signaling message with the new port and address fields.

BRIEF DESCRIPTION OF THE DRAWING

FIG. 3 illustrates the possible failure, in such circumstances, of the incoming bearer stream to reach the local user.

FIG. 5 illustrates the possible failure, in such circumstances, of the incoming bearer stream to reach the local user.

FIG. 7 is a simplified diagram of a flow of messages similar to that of FIG. 6, but in which the local user agent (UA) uses a digital signature for message integrity on the SDP body. FIG. 7 illustrates the possible failure, in such circumstances, of the incoming bearer stream to reach the local user.

DETAILED DESCRIPTION

1. Example Network

Below, we will describe SAFENeT in the context of an example network which is typical of an enterprise network with high security needs that supports VoIP. To the extent that any specific features of such a network are described here, they are meant to be illustrative only, and not to be limiting as to the scope of the present invention.

Our example network uses firewalls, or NAT, or both. The firewall, if used, allows incoming signaling messages between remote hosts and the call server, and also allows incoming messages between local clients and their call servers. For convenience only, and without loss of generality, user agents (UAs) are assumed to have private addresses to which there are no valid routes from the remote UA. The term "user agent" denotes an endpoint or the like in the context of SIP-based communications. For purposes of illustration we adopt SIP as an example signaling protocol. However, as noted above, our method is equally applicable to other signaling protocols, such as H.323.

Our example network supports hop-by-hop encryption techniques, such as SIPS over TLS. Encrypted messages can only be processed by SIP entities (i.e., SIP proxies and user agents).

Our example network also supports S/MIME. "S/MIME" is a standard from the Internet Engineering Task Force (IETF) for providing security, integrity, and authentication. S/MIME was developed originally for secure email transmissions. User agents can choose to add one or both of: end-to-end message integrity on S/MIME bodies with digital signatures, and end-to-end encryption of S/MIME bodies. UAs generally use S/MIME to protect the Session Description Protocol (SDP) body but can also protect a copy of the SIP headers. Only UAs can process cryptographic S/MIME bodies. However, we do not require UAs to copy encrypted headers (such as the media address) into clear headers, as this would, among other things, defeat the purpose of encryption.

For simplicity, and without loss of generality, we assume that the NAT will select a new public port number for each new connection and check the source IP address of the reply (along with the destination IP address and port). This behavior is sometimes called "symmetric NAT", as defined in the IETF RFC 3489.

We assume that local traffic cannot be routed outside the local network. For example, it is prohibited to force traffic between local UAs out to the NAT and back, and it is prohibited for a UA to send its private address outside the NAT. In particular, a local UA is not permitted to send, outside the local network UA, an SDP body containing its private address.

We assume further that the local call server may apply cryptographic functions (e.g., S/MIME encryption) on behalf of its UAs. Under this model, the call server may sign or encrypt messages on behalf of its UAs if, e.g., the UAs do not support S/MIME or do not have individual public key certificates.

2. VoIP Message Flow Examples

Figure 1:
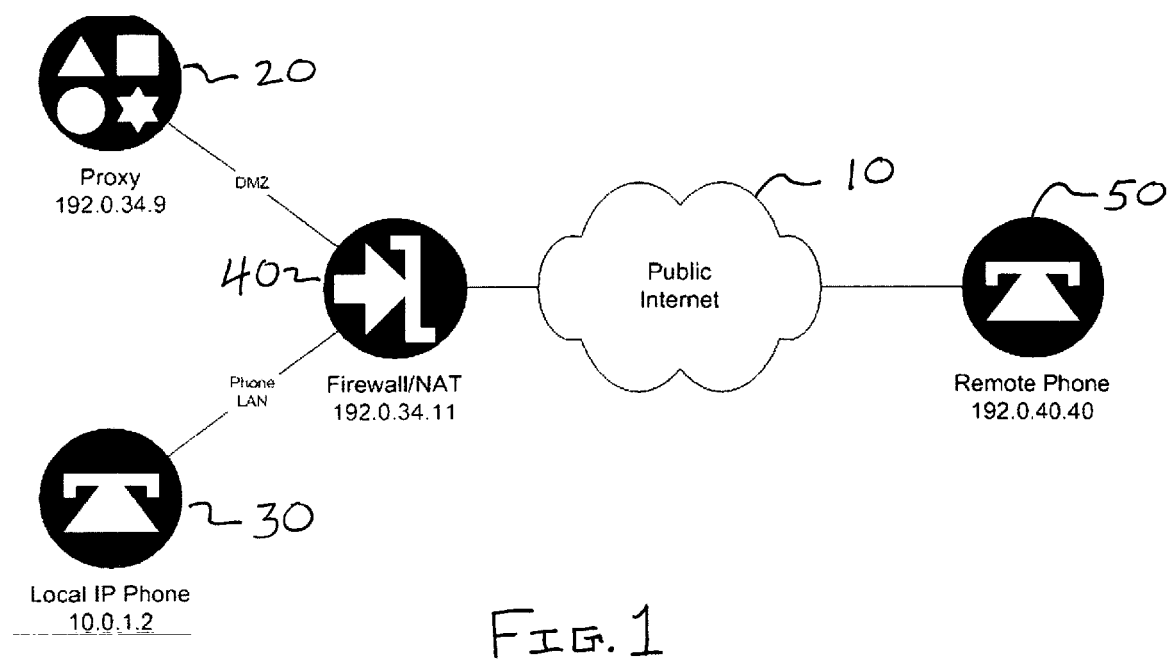
FIG. 1 is a simplified schematic view of an example network in which the methods described here can be practiced.

FIG. 1 shows our example network, in which to the left side (as seen in the figure) of public internet 10 is the local network, including SIP Proxy 20 in a demilitarized zone (DMZ) and local IP phone 30 on a phone LAN network. The local network includes a single NAT-enabled firewall 40, from which connection to the Internet is made. The right side of the figure shows remote IP phone 50. For simplicity, we will assume in the examples below that the remote phone is directly connected to the Internet.

FIGS. 2-9 illustrate the critical SIP and RTP messages exchanged, according to various protocols, between a local UA represented by phone 30, local proxy 20, a NAT, represented by NAT-enabled firewall 40, and a remote UA, represented by remote phone 50. Below the graphical representations of message flow in the figures are excerpts of selected messages.

Figure 2:
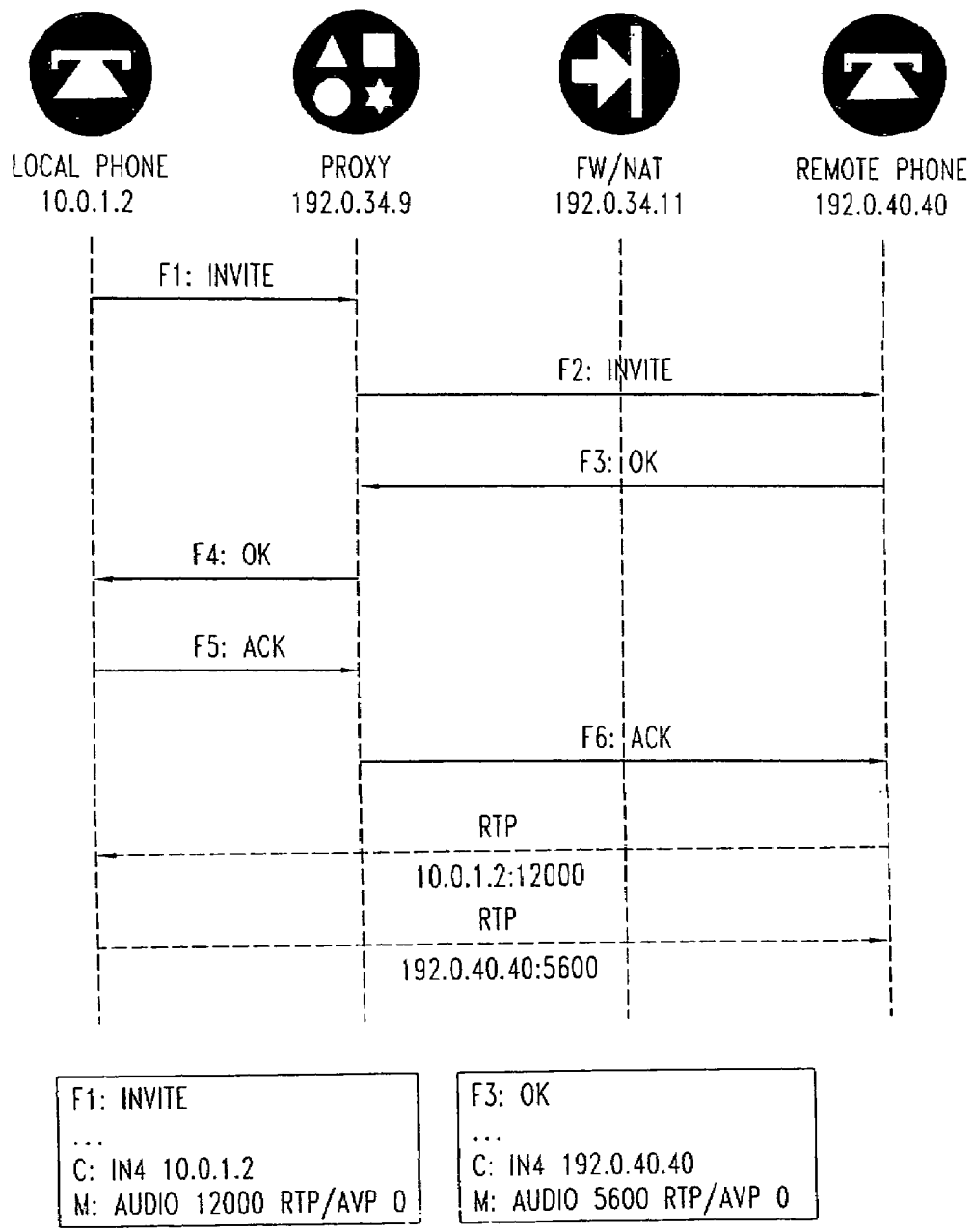
FIG. 2 is a simplified diagram of a flow of messages in an illustrative network of the prior art that does not use NAT or a firewall.

FIG. 2 shows the flow of messages in a network that does not use NAT or a firewall. We assume here that the private addresses are in the same domain and routable between all parties. In the signaling session, the local proxy forwards the INVITE message from the local UA to the remote UA, the OK message from the remote UA to the local UA, and the ACK message from the local UA to the remote UA. The UAs then commence the bearer session. The message flows are typical SIP message flows.

Reference is made to the excerpted "F1: INVITE" message shown at the bottom of FIG. 2. The format of the excerpts is defined in the IETF Standard, RFC 2327. It will be noted that the SDP includes the line, "c: IN4 10.0.1.2" and the line "m: audio 12000 RTP/AVP 0". The purpose of the "c:" line, which is referred to as the "connection information", is to provide the UA's network address. The purpose of the "m:" line, which is referred to as the "media name", is to indicate the media type (or Codec) and port number for the media stream. In the "c:" line, IN4 means Internet Protocol (IP) version 4, and 10.0.1.2 is the IP address of the UA. In the "m:" line, "audio" indicates that the stream is an audio stream, "RTP/AVP" means Real-time Transport Protocol Audio Video Profile, and "0" indicates G.711 (an International Telecommunications Union (ITU) defined protocol for uncompressed audio). It will be seen that in the excerpted "F3: OK" message, the remote UA responds with the media description for sending the bearer traffic to it.

Figure 3:
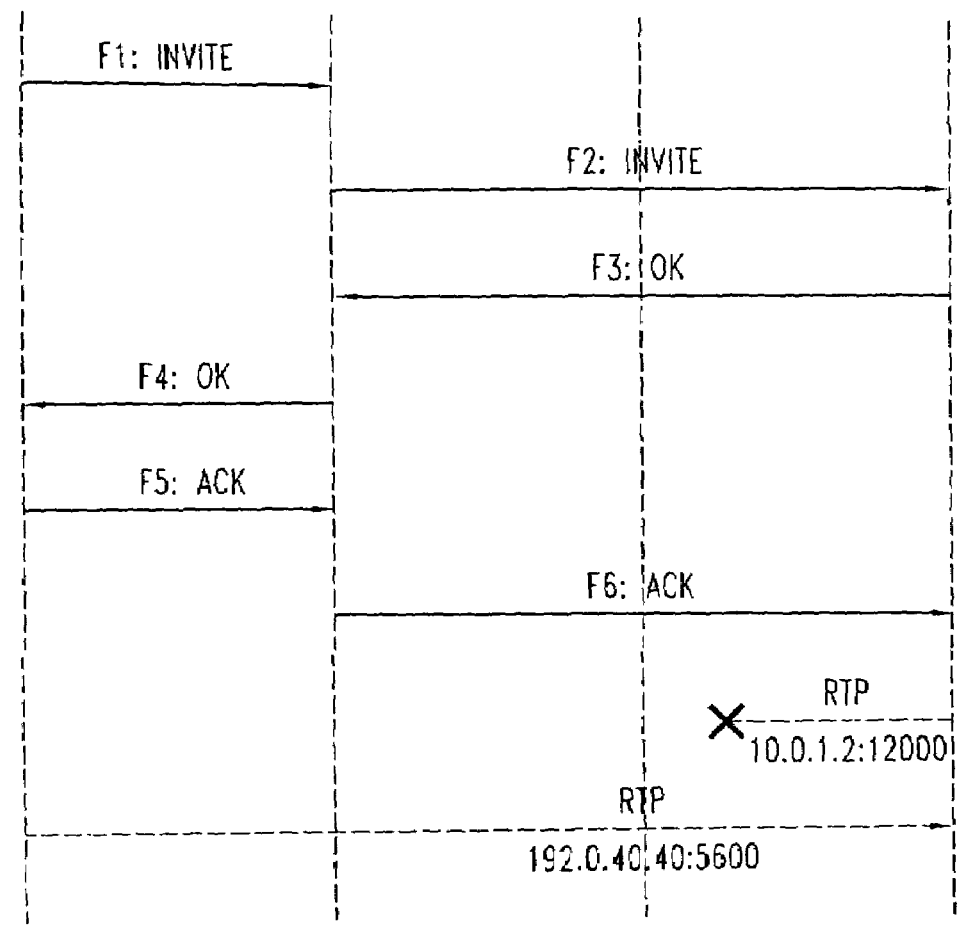
FIG. 3 is a simplified diagram of a flow of messages in a hypothetical network that uses NAT, but without any special traversal techniques.

FIG. 3 shows the message flows corresponding to the situation depicted in FIG. 2, with the single difference that NAT is enabled, but without using any special techniques for traversing the middlebox. The local phone is unaware of the NAT, and therefore sends an SDP with its private address and port. By assumption, the local phone uses an address that is only meaningful to its own network, which includes the call server. For example, the local phone may use one of the "private" IP address ranges defined in RFC 1918, which cannot be routed across the Internet. Because of this assumption, the remote endpoint (more specifically, a router at the remote endpoint's site) is unable to route the RTP stream back to the local host. It is possible that the remote user might hear the local user, but the local user cannot hear the remote user.

Figure 4:
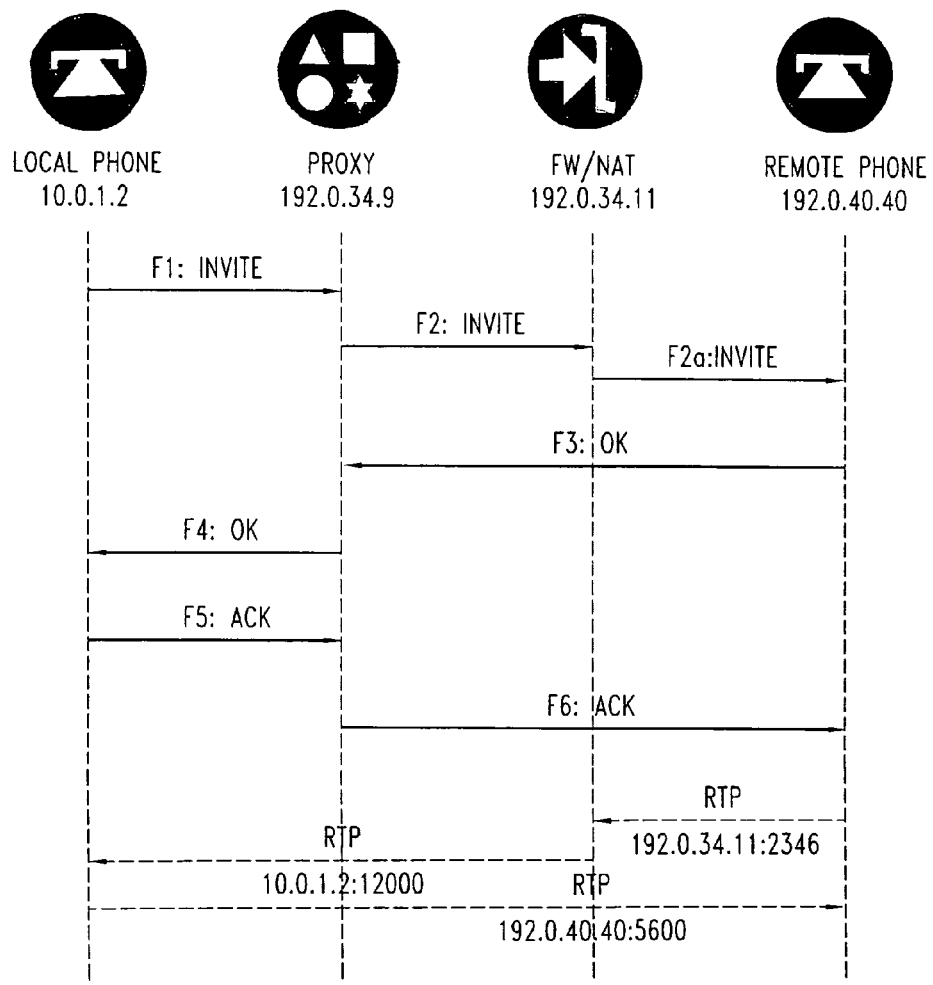
FIG. 4 is a simplified diagram of a flow of messages in an illustrative network of the prior art that uses an ALG to pass traffic through the firewall, but does not use cryptography.

FIG. 4 shows the flow of messages in a network that uses an ALG to pass traffic through the firewall, but does not use cryptography. The ALG rewrites the INVITE message such that the remote UA gets the correct (public) address and port for the RTP stream. The UAs are able to communicate.

It will be seen in the F2 a INVITE message of FIG. 4 that the local address of local UA 30 is rewritten as 192.0.34.1 1, and the local port is rewritten as 2346.

It should be noted in this regard that the NAT maintains a record (binding) of which port/address is paired to which other port/address. When the packet goes outbound through the NAT, the NAT maps it from the private port-address pair to the public pair, and vice versa for inbound traffic. We use the terms "mapping" and "binding" interchangeably.

Figure 5:
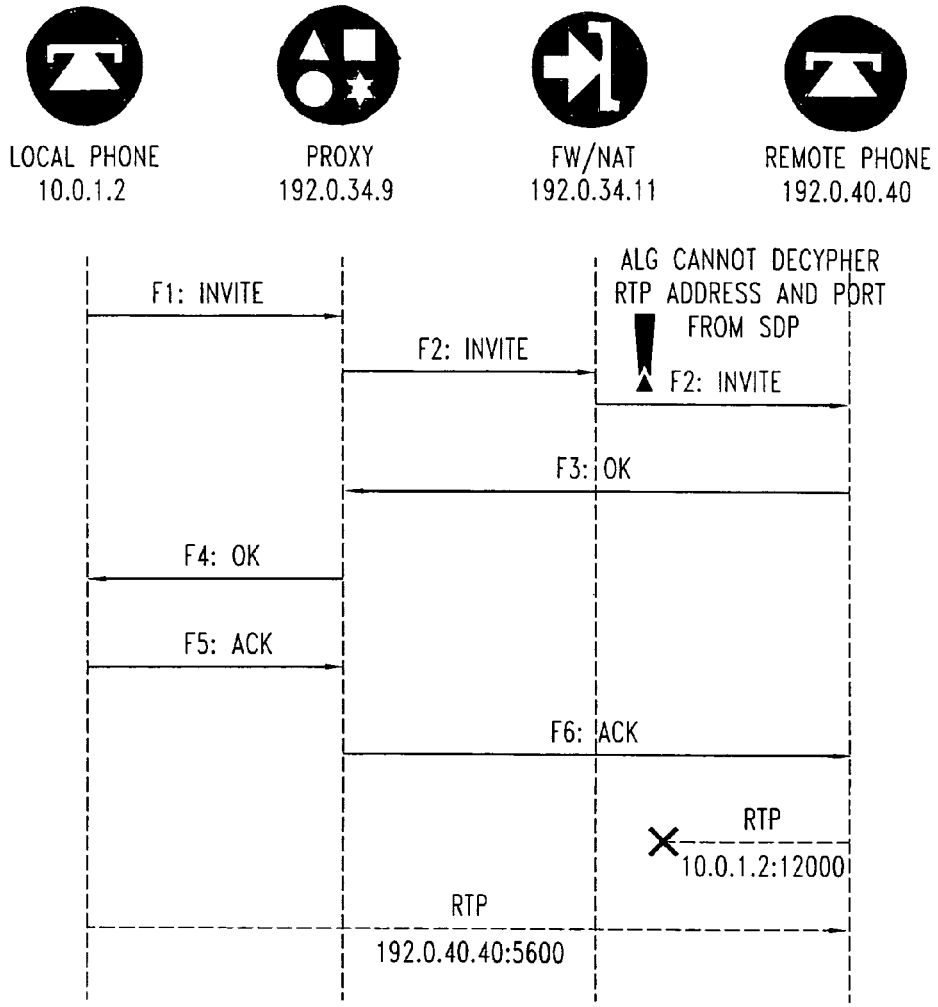
FIG. 5 is a simplified diagram of a flow of messages in a hypothetical network that uses an ALG to pass traffic through the firewall and also uses cryptography.

FIG. 5 shows the flow of messages in a network using an ALG as in FIG. 4, but with encryption of messages. In this case, unlike that of FIG. 4, the ALG is unable to process the INVITE message because it cannot decipher the encrypted SDP body, which contains the local RTP address and the local port number. As a consequence, the network behaves essentially as in the example of FIG. 3, and the UAs are unable to communicate with each other. It should be noted that if instead of encrypting the INVITE message, the local network had combined it with a digital signature for message integrity, the remote UA would have detected that the message had been modified and would consequently have rejected the request.

Figure 6:
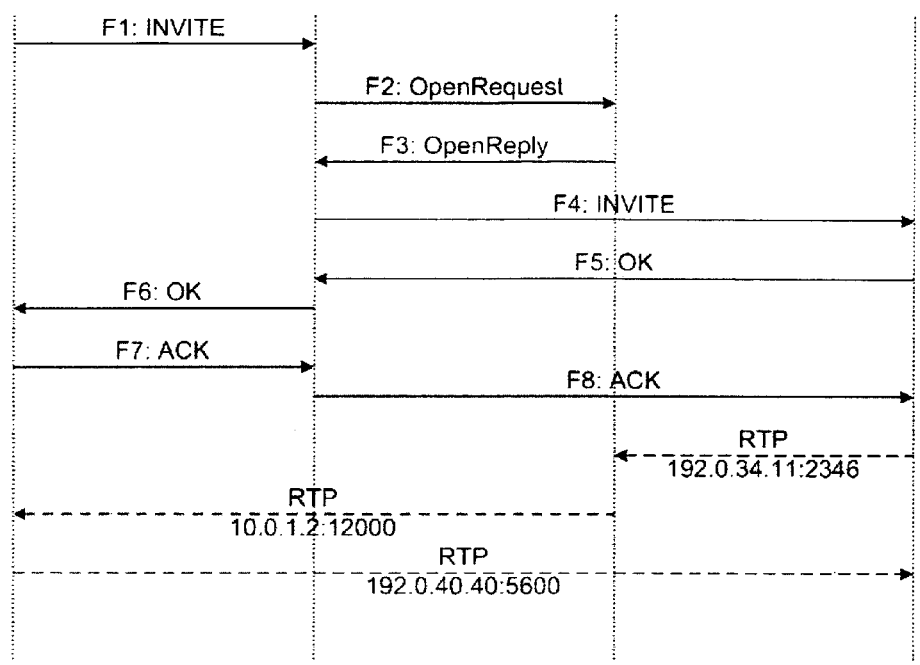
FIG. 6 is a simplified diagram of a flow of messages in an illustrative network that uses a procedure to be described below, which we refer to as the "basic SAFENeT algorithm."

As noted above, we have developed a new method for treating messages, which we refer to as SAFENeT, which enables the messages to traverse the firewall or NAT box. FIG. 6 shows the message flow for a simple version of SAFENeT, which we refer to as the basic SAFENeT algorithm. In particular, the basic SAFENeT algorithm does not support S/MIME.

As shown in the figure, local proxy 20 uses SAFENeT to obtain a new NAT binding from the NAT and to rewrite the SDP. In performing these particular steps of the basic SAFENeT algorithm, proxy 20 does not interact with the UA. The "binding" is the address and port mapping that the NAT implements for that session.

More specifically, proxy 20 receives the INVITE message and determines that it needs to be routed over the NAT. Proxy 20 then contacts the NAT to obtain a binding (messages F2 and F3). Next (message F4), proxy 20 rewrites the SDP such that the local public address and port are substituted for the private address and port, and it sends the message to the remote host. The rest of the process follows as normal.

The binding that the NAT sets up will affect packets in both directions. The remote UA will send packets to the local public address and public port. The NAT will alter the header of such an incoming packet by replacing the public address and public port with the private address and private port. On outgoing packets, the NAT will conversely alter the source address and source port of the local UA. Thus, the remote host will see only the public address and public port, which proxy 20 has learned through the operation of SAFENeT.

FIG. 7 shows the message flows for a scenario in which the basic SAFENeT algorithm is used in a manner similar to the scenario above. In the scenario of FIG. 7, however, the local UA 30 applies a cryptographic digital signature to the SDP body and appends the signature to the message. The purpose of the digital signature is to provide message integrity and authentication. That is, the remote UA can check the signature's validity to prove that (a) the local UA generated the message (authentication) and (b) the message was not altered while in transit (integrity).

The local proxy behaves as described in regard to FIG. 6, that is, it updates the content of the SDP to reflect mapping by the NAT. However, when the remote UA 50 receives the INVITE message, it will detect that the SDP has been modified. The remote UA must reject the message because the signature is invalid and must respond by transmitting a "403 Forbidden" message.

Figure 8:
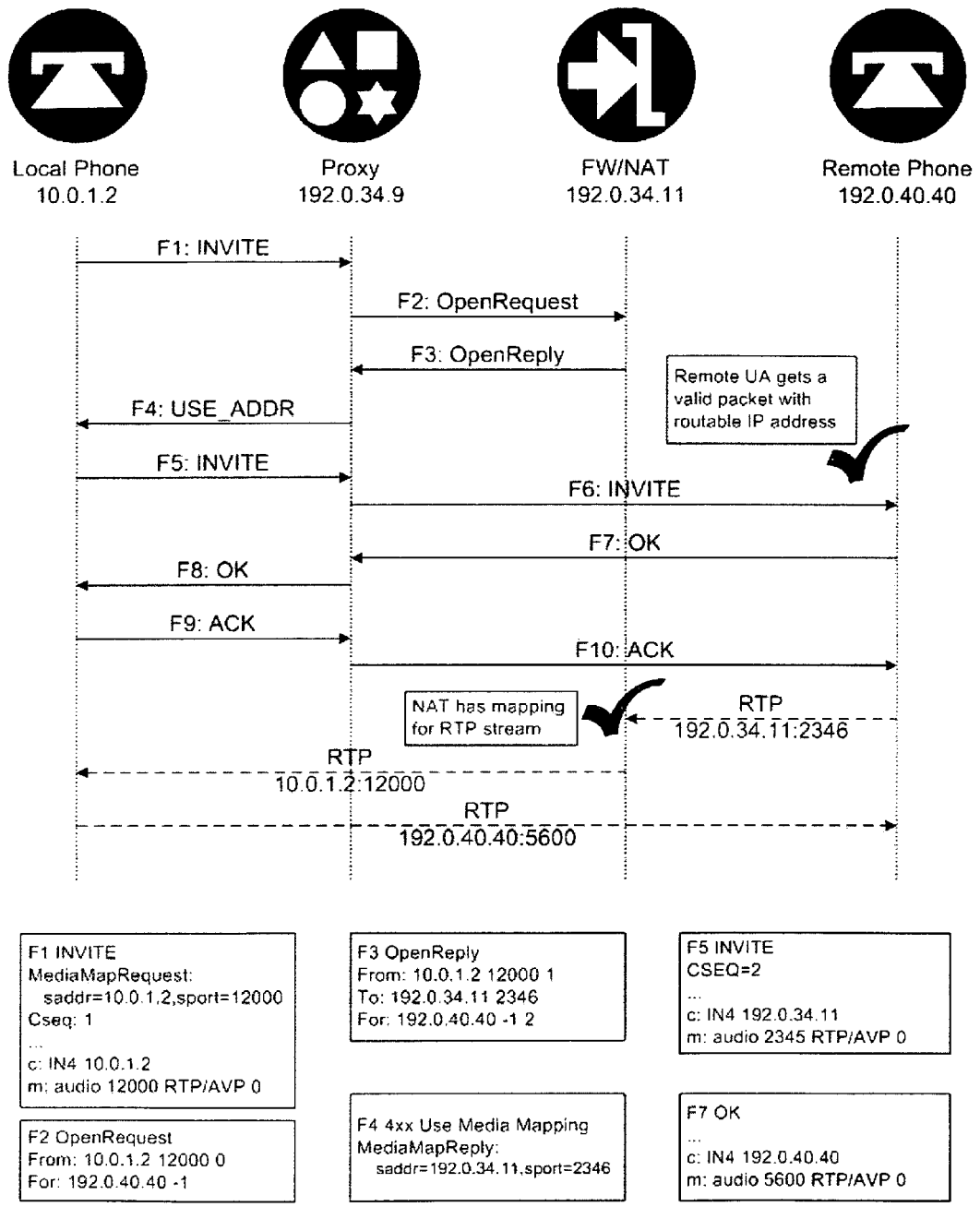
FIG. 8 is a simplified diagram of a flow of messages similar to that of FIG. 7, but in which support for end-to-end cryptography has been added to the SAFENeT algorithm. The message flow of FIG. 8 corresponds to an outgoing request.

FIG. 8 shows the message flows for an extended version of the SAFENeT algorithm that includes support for S/MIME for encryption or integrity. After local proxy 20 obtains the NAT mapping, it sends the result to local UA 30 (message F4). The local UA generates an SDP body with the new address and port and includes it in a new INVITE (message F5). The message flow continues as described above in regard to FIG. 7, including the end-to-end application of a encryption or digital signature by the UA. Note that remote UA 50 will receive a valid SDP body that bears the public address of the local UA. The SDP body has a valid signature because the local UA included the new (public) address and port before applying the digital signature. Also note that the NAT will have the correct mappings for the RTP streams and that it does not need to modify the signaling message.

Figure 9:
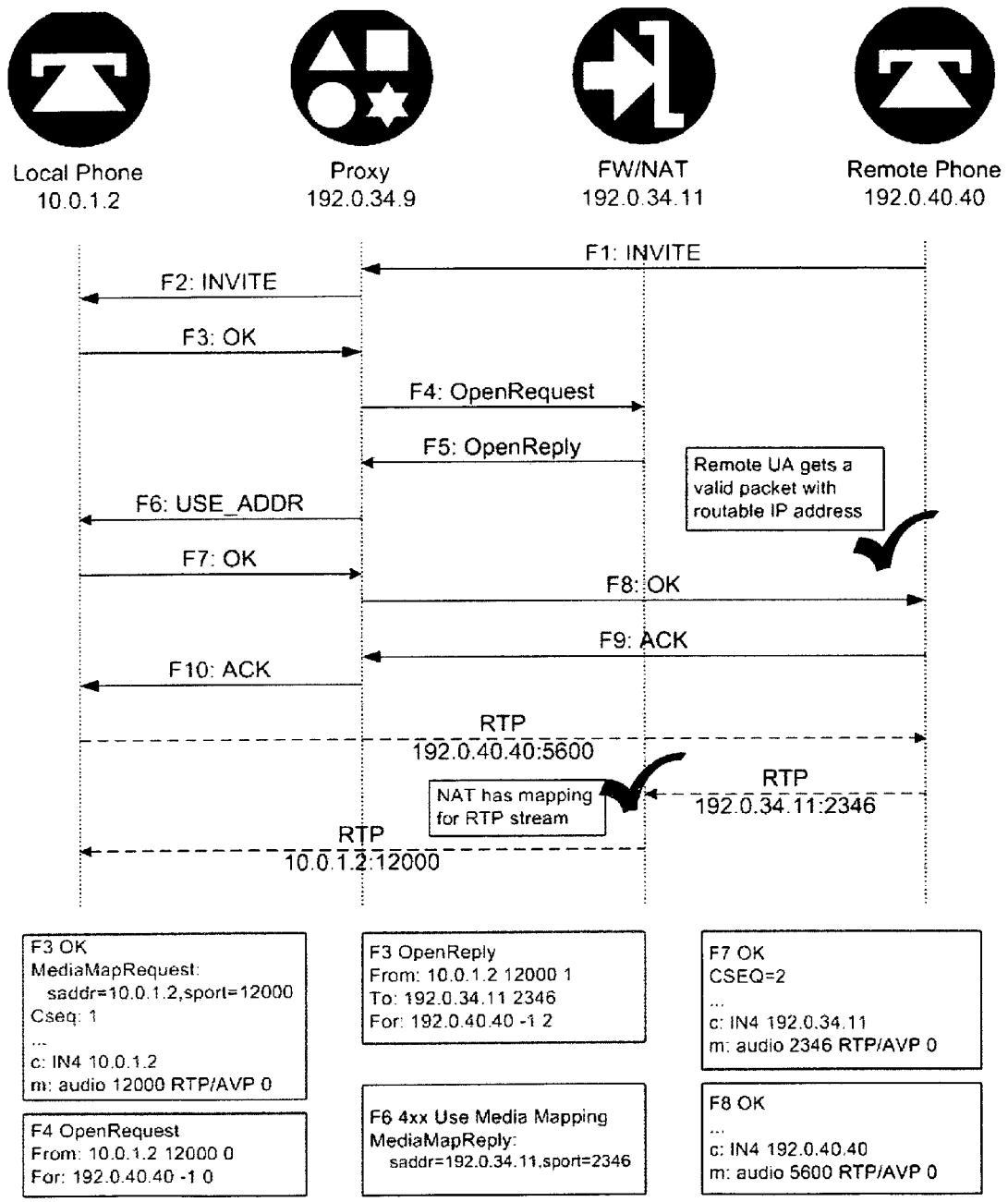
FIG. 9 is a simplified diagram of a flow of messages similar to that of FIG. 8, but corresponding to an incoming connection request.

FIG. 9 shows the message flows for the SAFENeT algorithm for an incoming INVITE request. The message flow corresponds to the outgoing request of FIG. 8, except that in FIG. 9 the local proxy is shown applying the algorithm to the OK message (message F3) instead of the INVITE message. Again, after the signaling completes, both UAs have valid SDPs with the other's public address and ports, and the NAT has the correct mappings.

3. General Description of Server-Based Architecture For Enterprise NAT/FW Traversal (SAFENeT)

As noted above, we have developed a new solution to the problem of how VoIP bearer (or "media") sessions can traverse the NAT box, firewall, or other middlebox. We refer to our solution as SAFENeT, for Server-based Architecture For Enterprise NAT/FW Traversal. (FW is an abbreviation for "firewall".) In the SAFENeT approach, the call server communicates with the firewall/NAT, in order to negotiate the address mapping for the media session.

SAFENeT includes two main parts. One part has been denominated "SCP" (SAFENeT Communication Protocol). SCP facilitates communication between the Call Server and its NAT and/or firewall. The second part has been denominated "SUCP" (SAFENeT UA Communication Protocol). SUCP facilitates the communication, from the local call server to the local endpoint, of the public port-address pair that the call server has established. SUCP is necessary to support end-to-end cryptography.

In a system without end-to-end encryption (i.e., without digital signatures or other methods to assure message integrity between the endpoints) SCP alone would be sufficient to solve the problem of traversing, e.g., the NAT box or firewall. Under SCP, the local call server would behave like an ALG to obtain the NAT binding for the media session and open a pinhole in the firewall.

As noted above, SUCP is needed to support end-to-end cryptography, such as S/MIME encapsulation of SDP bodies. The local UA (i.e., the local endpoint) needs to generate an SDP body that includes the public port-address pair that the local call server has established. Thus, the local UA must obtain that information from the call server before sending the INVITE or OK message. It should be noted in this regard that SUCP is only applicable when the signaling message needs to be changed to reflect that the NAT has applied a mapping. For example, if both UAs are on the same network (i.e., there is no NAT between them) the original signaling message has the correct information. In such a case, the step using SUCP can be omitted because the signaling message does not change.

Among the advantages of SAFENeT are the following: The call server controls the packet routing and handles all VoIP packet processing, without a need for any further proxies or servers; the user agent need communicate only with the call server; and any type of NAT can be supported.

The call server is configured with rules about how the network routes the media streams so that it can determine if the media stream traverses a middlebox (MB), or which MB is traversed if there are more than one. In simple networks, it may be sufficient to tell the call server the networks that make up the local network (inside the MB) so that it knows that the MB has to be used if one endpoint is local and the other is remote. Rules for more complicated networks might include, for example, a list of those subnets with voice endpoints that connect directly, a list of those subnets that lie within the subscriber's enterprise but are not NAT-enabled, a specification of default routes toward the firewall/NAT, and a specification of where to apply IPv4/v6 mappings.

It should be noted that under SAFENeT, the only entities with which the UA needs to communicate are its call server (for signaling) and remote UAs (for bearer streams). To support end-to-end cryptography, the call server proxies the NAT binding requests on behalf of the UA. This minimizes the amount of configuration data the UA needs. In order to implement SAFENeT with support for end-to-end cryptography, only small modifications are needed to a conventional UA. Specifically, a slight modification to the SIP headers is needed, and the UA must be given the functionality to process a response from the call server to indicate the public NAT mapping. The needed modification to the UA is provided by SUCP, which will be described in detail below.

4. SAFENeT Middlebox Communication Protocol (SCP)

As part of the implementation of our SAFENeT procedure, we have defined a protocol, which we denominate SCP, for the call server (or proxy) to use when communicating with the NAT and firewall devices.

Under SCP, the call server requests a NAT mapping for the RTP stream described in the SIP SDP, the middlebox reserves the binding and replies with the mapping, the call server enables the binding, and the call server closes the binding after the call completes. If the middlebox supports firewall capabilities, SCP also opens a pinhole in the firewall (i.e., it permits the media stream using the given addresses and ports through the firewall).

We have provided an illustrative example in which a request to establish a connection for a media session is received from a local endpoint. Requests to modify or close the connection are similarly processed under SCP. Moreover, such request may be received from a local endpoint or from a remote endpoint.

In the context of SCP, a NAT or firewall device, or other middlebox, is referred to as an "SCP agent", and the call server or similar device is referred to as the "SCP manager".

The protocol assumes that it runs over a secure (i.e., authenticated and encrypted) transport protocol, such as TLS. TLS is a natural choice for SIP because SIP proxies are required to support it. Key validation is required for the system to be secure. It is recommended that the SCP agent be configured to only accept connections from authorized managers. Each device should authenticate its peer (e.g., using standard public-key-based cryptographic techniques).

SCP includes basic messages for opening a session, updating session parameters, and closing the session. As noted, the SCP protocol may run over TLS to provide authentication, message integrity, and privacy. SCP assumes that the SCP manager (which will typically be the call server) connects to the agent once (e.g., at boot time) and reuses the same TLS connection for all sessions.

In a typical scenario for an outbound call through a NAT, the manager sends an OpenRequest message to open a session based on the local UA's (private) address and port and the remote UA's address. Note that the remote UA is free to choose any ephemeral port. The SCP agent then chooses a session ID and builds a mapping for the given addresses and-port and-replies to the SCP manager with an OpenReply message. Once the remote UA accepts the call (typically, a call is deemed accepted when the call server sees a SIP ACK or OK message), the manager sends an UpdateRequest message to the SCP agent to activate the binding. The SCP agent replies to the SCP manager with an UpdateReply. Once the call completes (i.e., the call server sees the acknowledged BYE SIP message), the call server sends a CloseRequest message (with the session ID) to the SCP agent to delete the binding.

Occasionally, a Request message, such as an OpenRequest, CloseRequest, or UpdateRequest, may contain an error, such as a bad value or an unsupported feature. It is useful to provide the ability, in implementations of SAFENeT, for the SCP agent upon detecting such an error to respond with an ErrorMessage message in place of the ordinary reply message, such as OpenReply. The error message may indicate, e.g., which field caused the error and the type of error, and may optionally include a text description of the error.

Various types of message formats may be implemented for exchanging messages of these types. For purposes of illustration, we here describe a simple text-based message format that we have designed for SAFENeT. Those skilled in the art will appreciate that alternative formats may readily be implemented in its place.

The SCP protocol operates over a stream (we assume TLS or SSL is used to provide authentication, integrity, and privacy). The first message from the manager to the agent is the stream header, which is used to inform the agent of the SCP version number that the manager is using. All subsequent messages include a single request or response separated by a pair of CRLF (ASCII characters 0x0d followed by 0x0a, as in SMTP and other well-known applications). (The "0x" notation means that the number is a hexadecimal number. 0x0d and 0x0a are the ASCII values for the "carriage return" and "line feed" characters, respectively. The combination is a typical way to indicate the end of a line in a text file or network application.)

The manager can send any of three message types: OpenRequest, UpdateRequest, and CloseRequest. The agent can reply with OpenReply, UpdateReply, CloseReply, or an ErrorMessage. The reply from the agent must correspond to the last request made to the agent. The agent can also send Info messages. Info messages can provide asynchronous notifications to the manager to tell it, for example, that a transport session timed-out due to inactivity.

A similar format is used for all of the Request messages. The first line, which is the request header, indicates the message type and a session ID. Each transport session mapping has a unique session ID. Because the agent decides on the session ID, the OpenRequest does not specify one. Instead, the agent chooses the session ID and includes it in the OpenReply message. A request body, consisting of a sequence of request fields, follows the request header.

Table 1 shows the possible request fields. Most parameters can be set to zero to indicate that the value is unassigned, or be set to −1 to indicate a wildcard. When the session is activated, the agent must verify that all the appropriate fields have been set. For example, a NAT's policy may require that the local address and port be set, as well as the destination address. The interface parameter can be used to specify a particular interface on the middlebox. In general, the manager needs to know a priori the meaning of the interface value. For example, the middlebox might expect the SNMP ifIndex or some other interpretation. The manager should set the interface value to 0 (unassigned) unless it knows the specific interface value.

TABLE 1

Request Field Table

| Request Type | Parameters | Description |
| --- | --- | --- |
| From: | address port iface | The local (private) address and port and middlebox interface |
| To: | address port | The mapped (public) address and port |
| For: | address port iface | The remote destination |
| Proto: | IP Protocol | Specific IP protocol (e.g., UDP or TCP) |
| Active: | boolean | "True" to activate the mapping |
| Action: | type | Firewall action can be block, reject, allow, or log |

The RTP standard defines Real-time Transport Control Protocol (RTCP) for passing statistics about the quality of the real-time session (e.g., delay and packet loss). The RTP standard states that each RTP session should send RTCP updates every five minutes. The standard recommends that RTCP use a port number that is equal to the RTP stream's port number plus one. Most VoIP implementers ignore this requirement, partly because the typical phone conversation lasts less than five minutes. To support RTCP, the NAT must map the RTP port and RTCP to two consecutive public ports. To support this feature, SCP accepts a port range in place of the usual port number.

Below, we will provide an example demonstrating the SCP protocol.

It should be noted that NAT mappings can be preallocated such that the call server can choose the public address-port pair without contacting the NAT for each session. Such preallocation may improve the performance of SAFENeT for applications such as VoIP. For a single call, SCP with preallocation can complete with a single message, instead of the two messages between the manager and agent (or three messages, in the case that the session activation is delayed until after the endpoints accept the call).

To make preallocation possible, the manager needs to reserve a block of public ports (and addresses, if appropriate) from the NAT for future mappings. The manager obtains a block of ports and session IDs from the agent using a message type that we have denominated Reserve-Block. The manager can specify the size of the block in the message body. The agent finds a suitable block of addresses and returns a list with the public address, port and session ID for each.

Once the manager has a block, it is free to determine its own mappings for those addresses. It still needs to use the UpdateRequest message to activate the mapping at the NAT.

Without preallocation, each call will typically require the manager to send two messages: An OpenRequest to the agent to obtain the mapping, and an UpdateRequest to activate the mapping. With preallocation, however, the manager need make only a single ReserveBlock call to obtain the block, and the mappings can be created locally. Thus, the manager can skip the OpenRequest message. The call server only needs to contact the agent if the call completes. For example, if the remote UA did not answer, or if it redirected the call to another endpoint (for example, by forwarding the call to voice mail), the call server would discard the original binding and choose a new one when the local UA sent the INVITE to the remote UA. If the local UA initiated a new call to the redirected UA, the call server would treat it as a new call.

5. SAFENeT UA Communication Protocol (SUCP)

We have provided SUCP as a means to send the NAT binding from the call server to the local UA so that the local UA can apply end-to-end cryptographic protection (e.g., a digital signature) on a message containing the new address-port pair. RTS protocols, such as SIP, currently lack a standard protocol for communicating NAT bindings between a NAT-aware call server and the local UA. SUCP requires an extension to the SIP headers. On an INVITE message, SUCP adds a single header specifying the local address and port and remote address of the media sessions (or a list of tuples if it opens multiple sessions). Next, the call server checks the message routing. If the call server determines that there is no NAT device on the path between the local and remote UAs, it does one of the following:

If the call server determines that the path between the local and remote UAs does not include a firewall, it passes the INVITE in the normal manner;

if the call server determines that the path between the local and remote UAs does include a firewall, it opens a firewall pinhole and passes the INVITE as normal.

On the other hand, if the call server determines that the path between the local and remote UAs does include a NAT device, it obtains a NAT address mapping using SCP and uses SUCP to send it to the UA. Next, the UA constructs a new INVITE message with the new public address. The process for a SIP OK message is essentially the same. On teardown, the call server uses SCP to close the binding and/or pinhole. SUCP is not involved in the teardown process.

An example of our new SIP header is:
MediaMapRequest: saddr=10.0.1.2,sport=12000.

The value denominated "saddr" is the source address. The value denominated "sport" is the source port. These values need to be included in the SIP header because the UA can encrypt the SDP. (As noted above, SDP is the session description protocol body.) The call server determines if the session requires a NAT. If not, it ignores (or removes) the request and processes the message as normal. If the session does require a NAT, the call server uses SCP to obtain a mapping and replies to the UA with a "4XX Use Media Mapping" message containing the mapping from the NAT. The UA then reconstructs the SDP with the new public address and port and sends the INVITE as normal (but with the same Call-ID as the first INVITE and appropriate CSeq).

6. EXAMPLES

Below, we describe the SCP and SUCP messages for the exemplary scenario represented in FIG. 8. In that example, a SIP UA with IP address 10.0.1.2 is behind a NAT (at 192.0.34.11) and needs to make a connection to a phone at a remote site, using the IP address 192.0.40.40.

The first INVITE message includes the SIP field, MediaMapRequest: saddr=10.0.1.2, sport=12000; saddr=10.0.1., sport=12001 The call server, seeing that the destination is behind the NAT-enabled firewall, uses the SCP protocol to obtain a mapping for the UA.

Table 2 shows the SCP message from the call server to reserve a mapping for the local UA on 10.0.1.2 to listen using port 12000 for RTP and port 12001 for RTCP. Note that the OpenRequest message does not specify a session ID. To explain the UpdateRequest message, we delay setting the remote destination address for the moment.

TABLE 2

Sample Open Request Message

OpenRequest
    From: 10.0.1.2 12000-12001 0
    For: 0 0
    Proto: UDP
    Active: False The NAT responds with an OpenReply message, as shown in Table 3. The NAT allocates a mapping from 10.0.1.2:12000 to 192.0.34.11:2346. It assigns the new session ID to 31824. It also fills in the unassigned fields from the request. In particular, it sets the "To:" line.

TABLE 3

Sample Open Reply Message

OpenReply 31824
    From: 10.0.1.2 12000-12001 1
    To: 192.0.34.11 2346-2347
    Proto: UDP
    Active: False Now that the call server has the public address and port for the UA, it replies to the UA using the SIP message shown in Table 4. The backslash (\) characters in the table indicate that the rows are treated as a single line by the SIP message processor. The first two lines indicate the mapping for the RTP stream; the next two are for the RTCP stream.

TABLE 4

Sample Use Media Mapping SCP Message

444 Use Media Mapping \
    saddr=10.0.1.2,sport=12000; \
    maddr=192.0.34.11,mport=2346; \
    saddr=10.0.1.2,sport=12001; \
    maddr=192.0.34.11,mport=2347

At this point, the UA has the NAT mapping it needs to advertise the public address and port to the far-end UA. It constructs a normal SIP message with the public address and port in the SDP.

The call server forwards the SIP INVITE to the far-end UA. After it gets the SIP OK reply from the far-end UA, the call server will activate the NAT binding by sending an UpdateRequest message. The original SCP messages (Table 2) did not include the destination address. The UpdateRequest message, shown in Table 5, includes the "For:" line specifying the destination address, 192.0.40.40. Note that it sets the destination port to the wildcard, −1. At this point in the SIP protocol, the call server does not know what port the remote host will use as the ephemeral RTP port. The call server includes the "Active:" line so that the NAT will enable the mapping to allow mapped traffic to the local UA.

TABLE 5

Sample Update Request Message

UpdateRequest 31824
    For: 192.0.40.40 −1 0
    Active: True

Next, as shown in Table 6, the NAT replies, acknowledging the request.

TABLE 6

Sample Update Reply Message

UpdateReply 31824
    For: 192.0.40.40 –1 2
    Active: True

At this point, the middlebox is ready to accept the RTP traffic from the remote UA (using the public destination address and port 192.0.34.11:2346) and map it to the private address (10.0.1.2:12000) for the UA. The RTCP stream uses port 2347 on the public side and 12001 on the private side.

7. Multiple NATs

In some networks, traffic may pass between back-to-back NAT devices. We refer to such a case as the "multiple NAT case." The version of SAFENeT described above is not optimized for the multiple NAT case, but it does support it. It is assumed in the version of SAFENeT described above that in most situations involving multiple NATs (e.g., between department or organization boundaries), each network use its own call server that communicates with its NAT.

The manager needs to be aware of both NATs and of the routing between them. Advantageously, the manager will issue multiple SCP commands to each NAT. The first set of SCP messages is to reserve a port (and address) from each NAT. The second set is to update each mapping with the ports obtained from the other NAT(s). Once all the bindings have been specified, the manager can send, to the local endpoint, the mapping from the NAT closest to the remote endpoint (i.e., it is the public address-port pair).

If the manager uses the option to reserve NAT port bindings ahead of time, the process is much simpler. The manager simply needs to choose ports for each NAT and to send updates to each NAT along the path specifying the neighboring NAT's port (or NATs' ports if more than two NATs are in series).

I claim:

1. A method for a call server to support a media session between a local endpoint and a remote endpoint, the local endpoint belonging to a local network that includes a middlebox which comprises a NAT, the method comprising: a) in a signaling session, receiving a message from the local endpoint or the remote endpoint, wherein the message requests to establish a connection for the media session and contains local and remote address information for the requested media session, and the local address information comprises private address information; b) forwarding the local and remote address information to the middlebox so that the middlebox will be able to identify packets associated with the media session from at least said information and will thereby be able to appropriately process said packets; c) receiving a mapping from the NAT which relates the private address information to public address information for the local endpoint; d) forwarding the mapping to the local endpoint; e) receiving a revised version of the message from the local endpoint, wherein the public address information has been substituted for the private address information; and f) forwarding the revised version of the message to a host computer associated with, respectively, the remote endpoint or the local endpoint.

2. The method of claim 1, wherein at least part of the revised version of the message is encrypted.

3. The method of claim 1, wherein at least part of the revised version of the message has an appended digital signature.

4. A method for a call server to support a media session between a local endpoint and a remote endpoint, the local endpoint belonging to a local network that includes a middlebox which comprises a NAT, the method comprising: a) in a signaling session, receiving a message from the local endpoint or the remote endpoint, wherein the message requests to establish a connection for the media session and contains local and remote address information for the requested media session, and the local address information comprises private address information; b) selecting public address information for the local endpoint from a stored block of public address information; c) creating a mapping which relates the private address information to the selected public address information; d) forwarding the mapping and the local and remote address information to the middlebox so that the middlebox will be able to identify packets associated with the media session from at least said information and will thereby be able to appropriately process said packets; e) causing the NAT to activate the mapping; f) forwarding the mapping to the local endpoint; g) receiving a revised version of the message from the local endpoint, wherein the public address information has been substituted for the private address information; and h) forwarding the revised version of the message to a host computer associated with, respectively, the remote endpoint or the local endpoint.

* * * * *

UNITED STATES PATENT AND TRADEMARK OFFICE
CERTIFICATE OF CORRECTION

PATENT NO. : 7,639,668 B2                                              Page 1 of 1
APPLICATION NO. : 11/141516
DATED : December 29, 2009
INVENTOR(S) : David Thomas Stott It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1176 days.

Signed and Sealed this

Twenty-first Day of December, 2010

David J. Kappos
*Director of the United States Patent and Trademark Office*